United States Patent
Lee

(10) Patent No.: US 9,292,537 B1
(45) Date of Patent: Mar. 22, 2016

(54) AUTOCOMPLETION OF FILENAME BASED ON TEXT IN A FILE TO BE SAVED

(71) Applicant: Bryant Christopher Lee, Bethesda, MD (US)

(72) Inventor: Bryant Christopher Lee, Bethesda, MD (US)

( * ) Notice: Subject to any disclaimer, the term of this patent is extended or adjusted under 35 U.S.C. 154(b) by 216 days.

(21) Appl. No.: 14/181,659

(22) Filed: Feb. 15, 2014

Related U.S. Application Data

(60) Provisional application No. 61/768,456, filed on Feb. 23, 2013.

(51) Int. Cl.
*G06F 17/30* (2006.01)

(52) U.S. Cl.
CPC .... *G06F 17/30179* (2013.01); *G06F 17/30115* (2013.01)

(58) Field of Classification Search
None
See application file for complete search history.

(56) References Cited

U.S. PATENT DOCUMENTS

| | | | |
|---|---|---|---|
| 6,208,339 B1 | 3/2001 | Atlas et al. | |
| 6,751,603 B1 | 6/2004 | Bauer | |
| 7,185,271 B2 | 2/2007 | Lee | |
| 7,774,003 B1 | 8/2010 | Ortega et al. | |
| 2004/0215663 A1* | 10/2004 | Liu | G06F 17/30017 |
| 2007/0055922 A1 | 3/2007 | Martynov et al. | |
| 2010/0036676 A1 | 2/2010 | Safdi et al. | |

OTHER PUBLICATIONS

Armbrust, Fox, Griffith, Joseph, Katz, et al., "Above the Clouds: A Berkeley View of Cloud Computing," U.C. Berkeley Technical Report No. EECS-2009-28, (Feb. 10, 2009) (http://www.cs.columbia.edu/~roxana/teaching/COMS-E6998-7-Fall-2011/papers/armbrust-tr09.pdf).

CMSC 411, Lecture 27, "Busses, I/O-Processor Connection" (http://www.csee.umbc.edu/~squire/cs411_l27.html) (Accessed Feb. 9, 2013).

Mell and Grance, "The NIST Definition of Cloud Computing," Special Publication 800-145, (Sep. 2011).

Devbridge, "AJAX Autocomplete for JQuery," (http://www.devbridge.com/projects/autocomplete/jquery/), (Accessed Feb. 10, 2013).

Oracle, "Endeca MDEX Engine, Basic Development Guide, Version 6.2.2," (Mar. 2012).

Jqueryui, "Autocomplete," (http://jqueryui.com/autocomplete/), (Accessed Feb. 10, 2013).

Stackoverflow, "How to Implement Autocomplete on a Massive Dataset," (http://stackoverflow.com/questions/678987/how-to-implement-autocomplete-on-a-massive-dataset), (Accessed Feb. 2, 2013).

apache.org, "Lucene 3.0.0 API," (http://lucene.apache.org/core/old_versioned_docs/versions/3_0_0/api/all . . . ) (Accessed Feb. 2, 2013).

Solr, "Solr and Autocomplete (Part 1)," (http://solr.pl/en/2010/10/18/solr-and-autocomplete-part-1/) (Feb. 2, 2013).

apache.org, "Suggestedr—a flexible 'autocomplete' component," (http://wiki.apache.org/solr/Suggester) (Accessed Feb. 2, 2013).

(Continued)

*Primary Examiner* — Anh Tai Tran

(57) ABSTRACT

A method and system may be used to save a file. In the method and system, text may be received from the user as an initial entry of a file name for the saving of the file. The method and system may propose one or more autocompletions of the user's entry based on text in the file to be saved.

20 Claims, 14 Drawing Sheets

(56) References Cited

OTHER PUBLICATIONS

Topcoder, "Using Tries," (http://community.topcoder.com/tc?module=Static&d1=tutorials&d2=usingTries) (Accessed Feb. 2, 2013).
about.com, "Enabling or Disabling Autocomplete," (http://wordprocessing.about.com/od/customizingword/qt/autocomplete.htm) (Accessed Feb. 2, 2013).
Bleepingcomputer, "Autocomplete Dropdown (in Windows, Not IE) Disabled Dropdown Boxes No Longer Work," (http://www.bleepingcomputer.com/forums/topic155570.html) (Accessed Feb. 2, 2013).
KDE Community Forums, "[Dolphin] Inline Autocomplete When Saving Files," (http://forum.kde.org/viewtopic.php?f=83&t=106607) (Accessed Feb. 2, 2013).
Flickr, "Auto Complete a File Name When Saving," (http://www.flickr.com/groups/photoshopsupport/discuss/72157625876011903/) (Accessed Feb. 2, 2013).
Pctools, "Use Auto-Complete in Word File Dialog Boxes," (http://www.pctools.com/guides/registry/detail/1243/) (Feb. 2, 2013).
Pcreview, "Turning Off File Naming Auto Complete," (http://www.pcreview.co.uk/forums/turning-off-file-naming-auto-complete-t1491139.html) (Accessed Feb. 2, 2013).

* cited by examiner

Alice's Adventures in Wonderland

CHAPTER I. Down the Rabbit-Hole

Alice was beginning to get very tired of sitting by her sister on the bank, and of having nothing to do: once or twice she had peeped into the book her sister was reading, but it had no pictures or conversations in it, 'and what is the use of a book,' thought Alice 'without pictures or conversation?'

So she was considering in her own mind (as well as she could, for the hot day made her feel very sleepy and stupid), whether the pleasure of making a daisy-chain would be worth the trouble of getting up and picking the daisies, when suddenly a White Rabbit with pink eyes ran close by her.

There was nothing so VERY remarkable in that; nor did Alice think it so VERY much out of the way to hear the Rabbit say to itself, 'Oh dear! Oh dear! I shall be late!' (when she thought it over afterwards, it occurred to her that she ought to have wondered at this, but at the time it all seemed quite natural); but when the Rabbit actually TOOK A WATCH OUT OF ITS WAISTCOAT-POCKET, and looked at it, and then hurried on, Alice started to her feet, for it flashed across her mind that she had never before seen a rabbit with either a waistcoat-pocket, or a watch to take out of it, and burning with curiosity, she ran across the field after it, and fortunately was just in time to see it pop down a large rabbit-hole under the hedge.

In another moment down went Alice after it, never once considering how in the world she was to get out again.

The rabbit-hole went straight on like a tunnel for some way, and then dipped suddenly down, so suddenly that Alice had not a moment to think about stopping herself before she found herself falling down a very deep well.

300

FIG. 3A http://example-url.com/alice-in-wonderland/ ◄——— 310

Alice's Adventures in Wonderland

CHAPTER I. Down the Rabbit-Hole

Alice was beginning to get very tired of sitting by her sister on the bank, and of having nothing to do: once or twice she had peeped into the book her sister was reading, but it had no pictures or conversations in it, 'and what is the use of a book,' thought Alice 'without pictures or conversation?'

So she was considering in her own mind (as well as she could, for the hot day made her feel very sleepy and stupid), whether the pleasure of making a daisy-chain would be worth the trouble of getting up and picking the daisies, when suddenly a White Rabbit with pink eyes ran close by her.

There was nothing so VERY remarkable in that; nor did Alice think it so VERY much out of the way to hear the Rabbit say to itself, 'Oh dear! Oh dear! I shall be late!' (when she thought it over afterwards, it occurred to her that she ought to have wondered at this, but at the time it all seemed quite natural); but when the Rabbit actually TOOK A WATCH OUT OF ITS WAISTCOAT-POCKET, and looked at it, and then hurried on, Alice started to her feet, for it flashed across her mind that she had never before seen a rabbit with either a waistcoat-pocket, or a watch to take out of it, and burning with curiosity, she ran across the field after it, and fortunately was just in time to see it pop down a large rabbit-hole under the hedge.

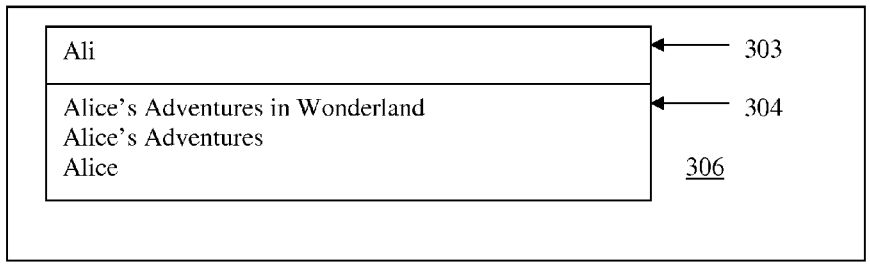

AUTOCOMPLETION OF FILENAME BASED ON TEXT IN A FILE TO BE SAVED

CROSS-REFERENCE TO RELATED APPLICATIONS

This application claims the benefit of U.S. provisional patent application Ser. No. 61/768,456 "Autocompletion of Filename based on Text in a File to be Saved" filed Feb. 23, 2013, which is hereby incorporated by reference in its entirety.

FIELD OF THE INVENTION

The present invention relates generally to methods of autocompletion, and more particularly, to methods and apparatuses for autocompleting a filename.

BACKGROUND

Users may save computer files for various reasons. They may wish to work on the file later. Or, they may wish to save a version of the file as it currently exists, so that they can revert to it if they dislike additional changes that are made to it. Files may also be saved to create copies on different storage mediums, or to move the file to a new storage medium. Furthermore, files might be stored so that the user may send the file over a network, such as by email or via the World Wide Web, which may operate over the Internet.

Autocomplete is a technique that may be used to suggest completions to a user's text entry. In some cases, autocomplete has been applied to a user's attempt to retrieve a file, but those attempts have been based on names of files on a computer hard drive. It would be desirable to suggest autocompletions when a user attempts to save a file and to do so in a more intelligent fashion.

SUMMARY OF THE INVENTION

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

One embodiment relates to receiving a request to save a file and presenting an interface for the user to enter a name for the file to be saved. The embodiment may then include receiving text entry from the user in the interface. The embodiment may provide at least one proposed autocompletion of the text entry from the user based on text in the file to be saved.

Another embodiment relates to building an autocomplete dictionary based on text in a file. The embodiment may then include receiving a request from a user to save a file. The embodiment may identify a portion of the text entry from the user to use as a prefix to access the autocomplete dictionary. The embodiment may access the autocomplete dictionary using the prefix. The embodiment may receive at least one proposed autocompletion from the autocomplete dictionary and provide it to the user.

Embodiments may relate to saving files locally or on remote servers or storage. Embodiments may relate to saving a wide variety of types of files.

Additional features and advantages of the invention will be set forth in the description which follows, and in part will be implicit from the description, or may be learned by the practice of the invention. The features and advantages of the invention may be realized and obtained by means of the instruments and combinations particularly pointed out in patent claims. These and other features of the present invention will become more fully apparent from the following description and any patent claims, or may be learned by the practice of the invention as set forth hereinafter.

BRIEF DESCRIPTION OF THE DRAWINGS

FIG. 3A illustrates an exemplary file that may be saved in some embodiments.

FIG. 3C illustrates an exemplary user interface that may be used in some embodiments.

DETAILED DESCRIPTION

Figure 1A:
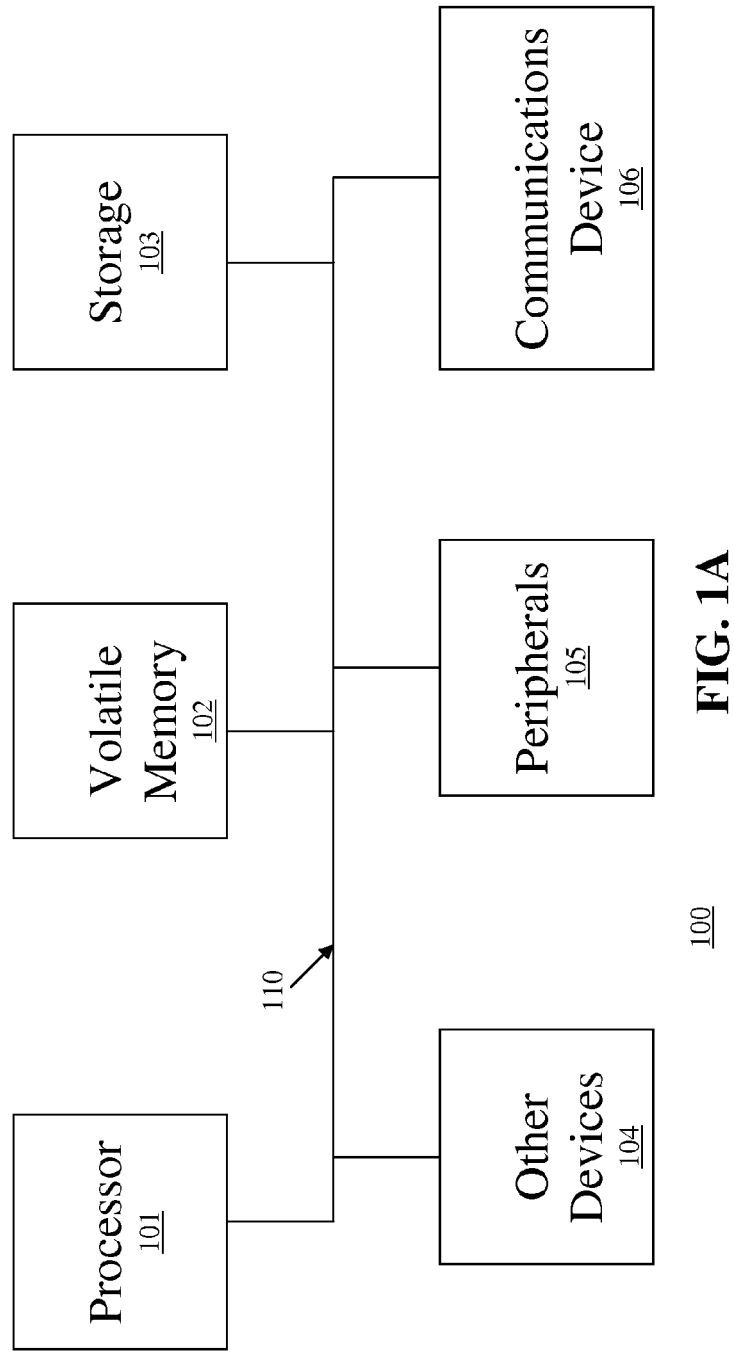
FIG. 1A is a diagram illustrating an exemplary computer that may perform processing in some embodiments of the invention.

In this specification, reference is made in detail to specific embodiments of the invention. Some of the embodiments or their aspects are illustrated in the drawings.

For clarity in explanation, the invention has been described with reference to specific embodiments, however it should be understood that the invention is not limited to the described embodiments. On the contrary, the invention covers alternatives, modifications, and equivalents as may be included within its scope as defined by any patent claims. The following embodiments of the invention are set forth without any loss of generality to, and without imposing limitations on, the claimed invention. In the following description, specific details are set forth in order to provide a thorough understanding of the present invention. The present invention may be practiced without some or all of these specific details. In addition, well known features may not have been described in detail to avoid unnecessarily obscuring the invention.

In addition, it should be understood that steps of the exemplary methods set forth in this exemplary patent can be performed in different orders than the order presented in this specification. Furthermore, some steps of the exemplary methods may be performed in parallel rather than being performed sequentially. Also, the steps of the exemplary methods may be performed in a network environment in which some steps are performed by different computers in the networked environment.

Embodiments of the invention may comprise one or more computers. Embodiments of the invention may comprise software and/or hardware. Some embodiments of the invention may be software only and may reside on hardware. A computer may be special-purpose or general purpose. A computer or computer system is defined to include without limitation personal computers, desktop computers, laptop computers, mobile devices, cellular phones, smart phones, PDAs, pagers, multi-processor-based devices, microprocessor-based devices, programmable consumer electronics, cloud computers, tablets, minicomputers, mainframe computers, server computers, microcontroller-based devices, DSP-based devices, embedded computers, wearable computers, electronic glasses, computerized watches, devices performing computations on a processor or CPU, and the like. A computer or computer system is further defined to include distributed systems, which are systems of multiple computers (of any of the aforementioned kinds) that interact with each other, possibly over a network, to achieve a goal (a goal includes performance of a method). Distributed systems may include clusters, grids, shared memory systems, message passing systems, and so forth. Thus, embodiments of the invention may be practiced in distributed environments involving local and remote computer systems. In a distributed system, aspects of the invention may reside on multiple computer systems.

Embodiments of the invention may comprise computer-readable media having computer-executable instructions or data stored thereon. A computer-readable media is physical media that can be accessed by a computer. It may be non-transitory. Examples of computer-readable media include, but are not limited to, RAM, ROM, hard disks, flash memory, DVDs, CDs, magnetic tape, and floppy disks.

Computer-executable instructions comprise, for example, instructions which cause a computer to perform a function or group of functions. Some instructions may include data. Computer executable instructions may be binaries, object code, intermediate format instructions such as assembly language, source code, byte code, scripts, and the like. Instructions may be stored in memory, where they may be accessed by a processor. A computer program is software that comprises multiple computer executable instructions.

A database is a collection of data and/or computer hardware used to store a collection of data. It includes databases, networks of databases, and other kinds of file storage, such as file systems. No particular kind of database must be used. The term database encompasses many kinds of databases such as hierarchical databases, relational databases, post-relational databases, object databases, graph databases, flat files, spreadsheets, tables, trees, and any other kind of database, collection of data, or storage for a collection of data.

A network comprises one or more data links that enable the transport of electronic data. Networks can connect computer systems. The term network includes local area network (LAN), wide area network (WAN), telephone networks, wireless networks, intranets, the Internet, and combinations of networks.

In this patent, the term "transmit" includes indirect as well as direct transmission. A computer X may transmit a message to computer Y through a network pathway including computer Z. Similarly, the term "send" includes indirect as well as direct sending. A computer X may send a message to computer Y through a network pathway including computer Z. Furthermore, the term "receive" includes receiving indirectly (e.g., through another party) as well as directly. A computer X may receive a message from computer Y through a network pathway including computer Z.

Similarly, the terms "connected to" and "coupled to" include indirect connection and indirect coupling in addition to direct connection and direct coupling. These terms include connection or coupling through a network pathway where the network pathway includes multiple elements.

The term "present" encompasses various mechanisms for causing the display of information. "Present" includes actions by a local computer to cause the display of information, such as calling a function that causes information to be displayed to the user at the local computer. "Present" also includes actions by a remote computer connected to the local computer over a network that cause information to be displayed on the local computer; for instance, "present" includes the remote computer sending a web page to the local computer that the local computer displays and "present" also includes the remote computer sending data or instructions to the local computer that causes the local computer to display information. Thus, a remote computer may "present" information, data, documents, web pages, and so forth on a local computer.

To perform an action "based on" certain data or to make a decision "based on" certain data does not preclude that the action or decision may also be based on additional data as well. For example, a computer performs an action or makes a decision "based on" X, when the computer takes into account X in its action or decision, but the action or decision can also be based on Y. As a real world example, to perform an action, say providing an umbrella, "based on" the fact that it is raining or make a decision "based on" the fact that it is raining does not preclude the fact that the action or decision may also be based on additional information, such as the fact that it is Monday and the user must go to work rather than just staying home. The term "based on" should be given a broad meaning because it can be very difficult to enumerate all possible factors that may influence an entity's actions or decisions.

In this patent, "computer program" means one or more computer programs. A person having ordinary skill in the art would recognize that single programs could be rewritten as multiple computer programs. Also, in this patent, "computer programs" should be interpreted to also include a single computer program. A person having ordinary skill in the art would recognize that multiple computer programs could be rewritten as a single computer program.

The term computer includes one or more computers. The term computer system includes one or more computer systems. The term computer server includes one or more computer servers. The term computer-readable medium includes one or more computer-readable media. The term database includes one or more databases.

The above definitions should also be applied to common variations of the above terms. For example, "presenting," "presented," and other variations of the term "present" should be construed consistently with the above definition of "present." Likewise for "transmit," "send," "receive," and the other relevant terms.

Background on the Internet: The Internet is a system of interconnected computer networks, which allows computer systems on the Internet to communicate with each other. Computers may communicate according to certain services such as electronic mail and the World Wide Web (WWW or "the web"). The WWW service is a system of interlinked hypertext documents. Documents on the web can be viewed with web browsers or other web-enabled applications. Web pages, text, images, videos, and other multimedia are all types of media that can be accessed in a web browser and other web-enabled applications. To view a document on the web, a client computer would usually send a request to a web server that is hosting web content. The client computer may identify the requested resource using an identifier such as a Uniform Resource Locator (URL). The web server would respond to the request by sending the appropriate document to the client computer. The client computer can display the document in a web browser or other web-enabled application. Web pages can be specified in many formats and languages. Sometimes, the web pages may include scripts, which are executable code. Web pages may also be backed by a database. Access to a web page may cause code to be executed on the web server and may cause accesses to a database. Web applications may also be Rich Internet Applications (RIAs) that operate on a software platform such as Flash or Silverlight. An RIA may require installation of the software platform on the client computer, for example by browser plug-in, in order to function.

Some embodiments of the invention relate to saving a file on a computer system. In particular, some embodiments relate to providing autocomplete functionality for a file name when the file is saved. Embodiments of the invention can provide their advantages to many different kinds of files that can be saved including: text documents, word processing documents, spreadsheets, presentations, emails, files in a database, web pages, and any other savable document containing text (or graphics that can be interpreted as text). Thus, embodiments of the invention may operate in conjunction with text processing programs, word processing programs, spreadsheet programs, presentation programs, email programs, database programs, web browsers, and other programs that allow saving files. Some embodiments may be a component or module of one of the aforementioned programs, such as a file save component or module.

Saving a file refers to saving a file in computer storage or computer memory, examples of which include databases, file systems, disks, non-volatile memory, removable media such as CD-Rs and DVD-Rs, and other media. The storage or memory may exist inside the local computer operated by the computer, but it could also exist on storage or memory external to the local computer. For example, a file may be saved to storage or memory located across a bus or network. Furthermore, the file could be saved to storage or memory that is connected to a remote server. Similarly, the file could be saved to a storage or memory unit in a distributed computing or cloud computing environment.

I. Exemplary Environments

FIG. 1A illustrates one environment in which embodiments of the invention may operate. Exemplary computer 100 may perform operations consistent with embodiments of the invention. The architecture of computer 100 is exemplary. Computers can be implemented in a variety of other ways. A wide variety of computers can be used in accordance with this invention; the term computer has been defined above.

Processor 101 may perform computing functions such as running computer programs. The volatile memory 102 may provide temporary storage of data for the processor 101. RAM is one kind of volatile memory. Volatile memory typically requires power to maintain its stored information. Storage 103 provides computer storage for data, instructions, and/or arbitrary information. Non-volatile memory, which can preserve data even when not powered and including disks and flash memory, is an example of storage. Storage 103 may be organized as a file system, database, or in other ways. Data, instructions, and information may be loaded from storage 103 into volatile memory 102 for processing by the processor 101.

The computer 100 may include peripherals 105. Peripherals 105 may include input peripherals such as a keyboard, mouse, trackball, video camera, microphone, and other input devices. Peripherals 105 may also include output devices such as a display. Peripherals 105 may include removable media devices such as CD-R and DVD-R recorders/players. Communications device 106 may connect the computer 100 to an external medium. For example, communications device 106 may take the form of a network adapter that provides communications to a network. A computer 100 may also include a variety of other devices 104. The various components of the computer 100 may be connected by a connection medium 110 such as a bus, crossbar, or network.

In one embodiment, the computer 100 stores a computer program implementing method 200 or other method herein in the volatile memory 102. Also in the volatile memory 102 may be a file that the user has opened. In response to a user request to save the file, the method 200 or other method herein may be performed resulting in the file being stored in the storage 103. Alternatively, the user may request to save the file to a removable storage medium such as a CD-R or DVD-R. In that case, the method 200 or other method herein may be performed resulting in the file being stored on a removable storage medium such as a CD-R or DVD-R (or optical disk, removable memory card, floppy disk, zip disk, magnetic tape, or so forth).

Figure 1B:
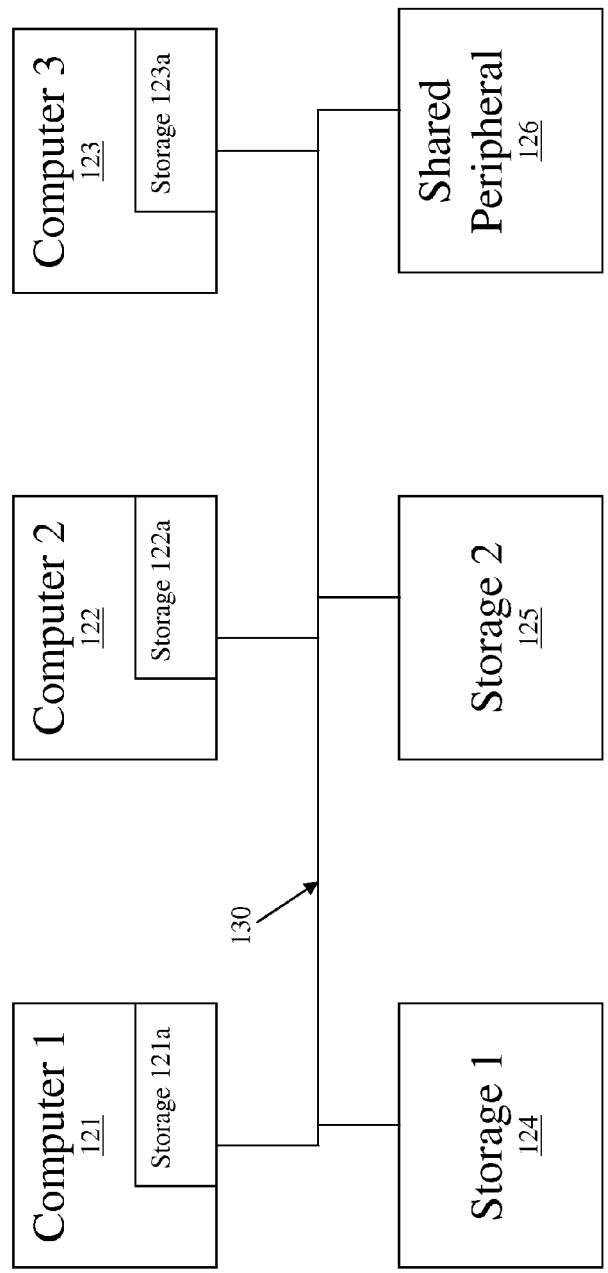
FIG. 1B is a diagram illustrating an exemplary environment in which some embodiments may operate.

FIG. 1B illustrates another environment in which embodiments of the invention may operate. In the exemplary environment 120, computer 1 (121), computer 2 (122), and computer 3 (123) are connected via a connection medium 130, which may be a bus, crossbar, network, or other interconnect. The computers may have local storage 121*a*, 122*a*, and 123*a*. The computers are also connected to storage 1 (124), storage 2 (125), and a shared peripheral 126. The storage units 124, 125 may be, for example, file systems, databases, disks, shared memory, or other storage. The storage units 124, 125 may each be implemented as a network of multiple storage devices, though they are illustrated as single entities. The shared peripheral 126 may be, for example, a shared printer, shared fax, shared input terminal, and so forth.

In one embodiment, the computer 121 may perform the method 200 or other method herein and, as a result, store a file on external storage 124 or external storage 125. Also, the computer 121 may perform the method 200 or other method herein and store a file on the storage 122*a* of computer 122 or storage 123*a* of computer 123, assuming that the computers 122, 123 have made their local storage available to computer 121.

The environment 120 is exemplary. Although shown with three computers, more or fewer computers could be on the connection medium 130. Similarly, although shown with two storage units 124, 125, more or fewer storage units may be used. Furthermore, embodiments of the invention may be used in environments where only a single computer, such as computer 121, is connected over a connection medium 130 to a single storage unit, such as storage 124. The shared peripheral 126 is optional and more or fewer peripherals could be used.

Figure 1C:
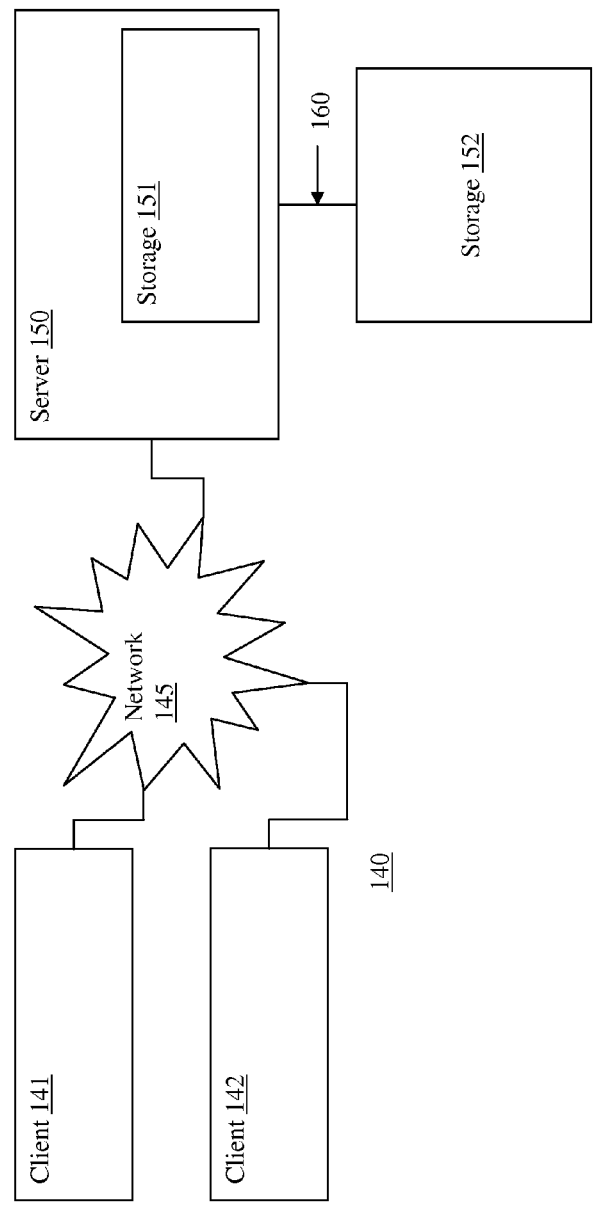
FIG. 1C is a diagram illustrating an exemplary network environment in which some embodiments may operate.

FIG. 1C illustrates another environment in which embodiments of the invention may operate. In the exemplary environment 140, two clients 141, 142 are connected over a network 145 to a server 150 having local storage 151. Clients and servers in this environment may be computers. Server 150 may be configured to handle requests from clients. Server 150 may be implemented as a number of networked server devices, though it is illustrated as a single entity.

The exemplary environment 140 is illustrated with only two clients and one server for simplicity, though in practice there may be more or fewer clients and servers. The computers have been termed clients and servers, though clients can also play the role of servers and servers can also play the role of clients. In some embodiments, the clients 141 and 142 may communicate with each other as well as the servers. Also, the server 150 may communicate with other servers.

The network 145 may be, for example, local area network (LAN), wide area network (WAN), telephone networks, wireless networks, intranets, the Internet, or combinations of networks. The server 150 may be connected to storage 152 over a connection medium 160, which may be a bus, crossbar, network, or other interconnect. Storage 152 may be implemented as a network of multiple storage devices, though it is illustrated as a single entity. Storage 152 may be a file system, disk, database, or other storage.

In an embodiment of the invention, the client 141 may perform the method 200 or other method herein and, as a result, store a file in the storage 152. This may be accomplished via communication over the network 145 between the client 141 and server 150. For example, the client may communicate a request to the server 150 to store a file with a specified name in the storage 152. The server 150 may respond to the request and store the file with the specified name in the storage 152. The file to be saved may exist on the client 141 or may already exist in the server's local storage 151.

In another embodiment of the invention, the client 141 may perform the method 200 or other method herein and, as a result, store a file in the storage 151. This may be accomplished via communication over the network 145 between the client 141 and server 150. For example, the client may communicate a request to the server 150 to store a file with a specified file name in the storage 151. The server 150 may respond to the request and store the file with the specified name in the storage 151. The file to be saved may exist on the client 141 or may exist in other storage accessible via the network such as storage 152, or even in storage on the client 142 (e.g., in a peer-to-peer system).

In accordance with the above discussion, embodiments of the invention can be used to store a file on local storage such as a disk or on a removable medium like a flash drive, CD-R, or DVD-R. Furthermore, embodiments of the invention may be used to store a file on an external storage device connected to a computer over a connection medium such as a bus, crossbar, network, or other interconnect. In addition, embodiments of the invention can be used to store a file on a remote server or on a storage device accessible to the remote server.

An example of applications where files are saved via a remote server include document management systems such as iManage WorkSite. Document management systems provide the advantage that documents are available to a user no matter which computer the user logs in from. Rather than storing data on the user's local client machine, data is stored in a database or other storage that is accessible via a pool of remote servers. Document managements systems also allow multiple users to share files with each other. Furthermore, they provide protection from corruption or loss of a user's local machine.

Content management systems are another application similar to document management systems where files are often stored via a remote server. A content management system is like a document management system, but a content management system is typically used to store files that are publicly accessible, such as files that comprise a web site.

Furthermore, cloud computing is another example where files are often stored on remote servers or remote storage systems. Cloud computing refers to pooled network resources that can be quickly provisioned so as to allow for easy scalability. Cloud computing can be used to provide software-as-a-service, platform-as-a-service, infrastructure-as-a-service, and similar features. In a cloud computing environment, a user may store a file in the "cloud," which means that the file is stored on a remote network resource though the actual hardware storing the file may be opaque to the user.

Embodiments of the invention may operate with respect to document management systems, content management systems, and cloud computing environments, just as they may operate, more generally, with respect to remote servers.

II. Exemplary Method

Figure 2A:
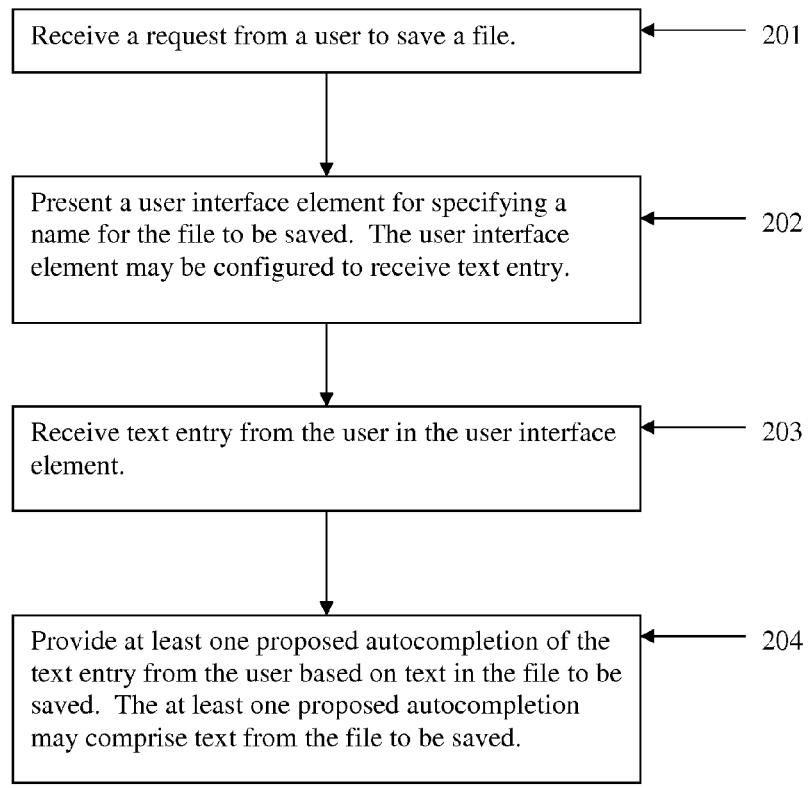
FIG. 2A is a flow chart illustrating an exemplary method that may be performed in some embodiments.

FIG. 2A is a flow chart illustrating one exemplary method 200 that may be performed consistent with the invention. The computer system performing the method may receive a request from a user to save a file (Act 201). This request may take the form of activation of a user interface element, utterance of a voice command, performance of a gesture, or other mechanisms of user input. For example, in some instances, the request may take the form of the user selecting a "save" or "save as" button or menu element.

In response, the computer may present a user interface element for specifying a name for the file to be saved (Act 202). For example, a local computer may present the user interface element by calling a function to cause the display of a user interface element. On the other hand, a remote computer may present a user interface element to the user by sending a signal that causes a local computer to display such a user interface element; alternatively, the remote computer may present a user interface element to the user by sending a document to a local computer for display that comprises such a user interface element. The user interface element may be configured to receive text entry. For example, the user interface element may comprise a text box.

The computer may receive text entry from the user in the user interface element (Act 203). Text entry may be accepted via user typing on a physical or virtual keyboard. Text entry can also be received via voice recognition software. When voice recognition software is used, words spoken by the user may be translated into text entered into a text box. Voice recognition software includes Simon, http://simon-listens.blogspot.com/; CMU Sphinx, http://cmusphinx sourceforge.net/; Zanzibar OpenIVR, http://www.spoken-tech.org/index.html; Julius, http://julius.sourceforge.jp/en_index.php?q=en/index.html; and RWTH ASR, http://www-i6.informatik.rwth-aachen.de/rwth-asr/).

The computer may provide at least one proposed autocompletion of the text entry from the user based on text in the file to be saved (Act 204). The proposed autocompletions may comprise text from the file to be saved. The fact that the proposed autocompletion is "based on" text in the file to be saved does not necessarily mean that all text in the file needs to be used; rather, it just means that some text in the file is used to propose the autocompletion.

Some of the steps of exemplary method 200 may be performed in different orders or in parallel. Also, the steps of exemplary method 200 may occur in two or more computers, for example if the method is performed in a networked environment. Various steps may be optional.

Figure 2B:
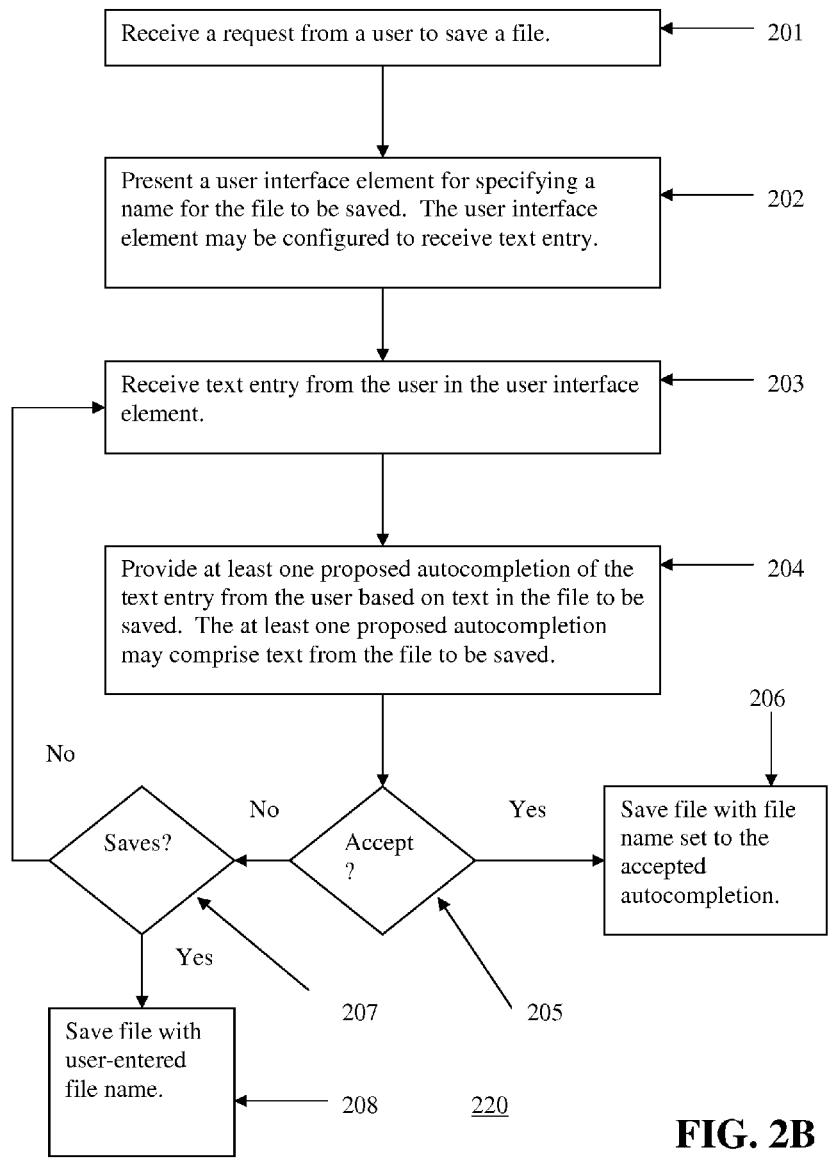
FIG. 2B is a flow chart illustrating an exemplary method that may be performed in some embodiments.

FIG. 2B is a flow chart illustrating additional steps that may be performed in accordance with the invention. The method 220 includes the steps of method 200 and additionally includes receiving additional input from the user. Namely, an acceptance of a proposed autocompletion may be received at decision 205, in which case the computer saves the file with file name set to the accepted autocompletion (Act 206).

On the other hand, if a rejection of the proposed autocompletions is received at decision 205, then processing continues. In some embodiments, rejection can be an affirmative action, but in other embodiments, rejection may just be the absence of acceptance. As shown at decision 207, a receipt of a save command may be received, in which case the user has elected to save the file with the file name as entered by the user (without accepting any autocompletions). In that case, the file may be saved with the user-entered file name (Act 208). Alternatively, the user may continue to enter characters into the text entry field, or delete or modify the characters already in the text entry field (return to Act 203). In response, the computer may provide at least one new proposed autocompletion of the text entry from the user based on text in the file to be saved (return to Act 204). The at least one new proposed autocompletion may comprise text from the file to be saved.

As discussed previously, the saved file may be saved on the local computer or on a remote storage device. (A remote storage device includes a hard disk or other non-volatile memory of a remote server and other storage devices that may be connected to a remote server).

Some of the steps of exemplary method 201 may be performed in different orders or in parallel. Also, the steps of exemplary method 201 may occur in two or more computers, for example if the method is performed in a networked environment. As one possible example, steps 201, 202, 203, 204, 205, and 207 may occur on a local computer while steps 206 and 208 may occur on a remote computer. In such an example, the local computer may be providing an interface for saving a file on a storage device connected to a remote server. In that case, the saving steps may occur on the remote server. Various steps may be optional.

III. Exemplary User Interfaces

This section describes some exemplary user interfaces that may be used in some embodiments of the invention. These interfaces are exemplary and should not be viewed as limiting.

FIG. 3A illustrates a file 300 that a user may wish to save.

Figure 3B:
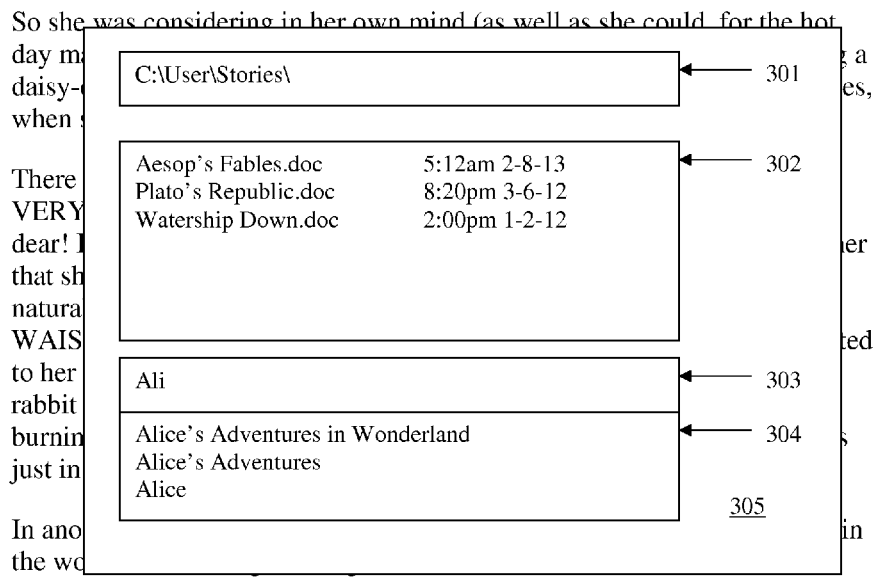
FIG. 3B illustrates an exemplary user interface that may be used in some embodiments.

FIG. 3B illustrates one possible presentation of a user interface for specifying a file name for the file 300 to be saved. The user interface element 305 is a pop up dialog box that allows the user to specify a file name. The text box 303 is configured to allow the user to specify the name for the file. The text box 303 is configured to accept text entry. The interface element 301 shows the current directory that the user is viewing. A file system or other storage may be divided into directories for organizational purposes. The user may change the directory using element 301, for instance by typing a new directory.

The interface element 302 shows the contents of the current directory. It shows the names of other files in the directory and their time of creation. Additional information could be shown, such as the size of these files.

The interface element 304 is a drop down menu showing different proposed autocompletions based on the text "Ali" that the user has entered in box 303. These proposed autocompletions are based on text in the file 300. In this example, each of these proposed autocompletions comes from text in the file itself.

In one embodiment, the user may select a proposed autocompletion by, for instance, tapping or clicking on it. The proposed autocompletion may then be populated in the text box 303. The user may then perform a save action such as pressing a save button, activating a user interface element, pressing a key, performing a gesture, issuing a voice command, or other action, to cause the file to be saved with the name populated in the text box 303. Alternatively, the file could be saved immediately once the user selects a proposed autocompletion, and named in accordance with the selected autocompletion.

FIG. 3C illustrates that the user interface element for specifying the name for the file to be saved does not have to appear as a pop up but could also appear in the same window or display as the file itself. The user interface element 306 provides the text entry box 303 for entering a file name and drop down 304 with proposed autocompletions. Such an interface can occur, for example, in web pages where it is sometimes desired to have all the user interface elements on a single page. In this interface, the user might select an autocompletion like "Alice's Adventures in Wonderland" and thereby cause the webpage contents to be saved on a remote server (or, alternatively, on the local computer). The http field 310 shows that this exemplary interface is directed to a page on the web.

Figure 3D:
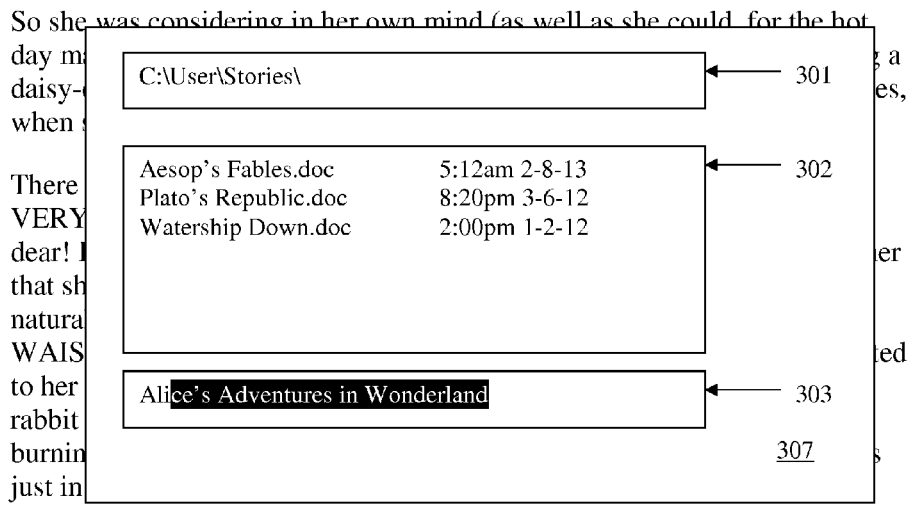
FIG. 3D illustrates an exemplary user interface that may be used in some embodiments.

FIG. 3D illustrates an additional possible user interface element 307 wherein the highest ranked proposed autocompletion is presented to the user as highlighted text. After the user entered "Ali," the computer determined that the most likely completion was "ce's Adventures in Wonderland." This is presented to the user after her entered text. Thus, not all implementations of autocomplete need to display a list of multiple proposed autocompletions. For example, in this embodiment, the computer may display only a single proposed autocompletion as highlighted text in the text entry box.

However, in some embodiments, both a preferred autocompletion (e.g., as highlighted text) and a list of possible autocompletions (e.g., as a drop down list) could be shown.

IV. Exemplary Implementations of Autocomplete

Autocomplete functionality may be implemented in a variety of ways. One basic way of implementing autocomplete is to compare the text entered by the user to each word or phrase in the file by iterating through the words or phrases in the file. Each matching word or phrase may be displayed as a proposed autocomplete. A match may be defined to occur when a word or phrase has the user-entered text as a prefix. However, there are more efficient ways of implementing autocomplete functionality than this basic method.

Autocomplete functionality can be plugged in using existing software packages such as Lucene (lucene.apache.org/core), Endeca (www.oracle.com/us/products/applications/commerce/endeca/overview/index.html), and various implementations of jQuery autocomplete (jqueryui.com/autocomplete/; www.devbridge.com/projects/autocomplete/jquery/).

Fast autocomplete could also be implemented from scratch by storing the words and/or phrases from a file in a data structure that can be quickly indexed by prefix. A trie is one such data structure. A trie is a type of tree. The root node is associated with the empty string, and all descendants of a node have a common prefix of the string associated with that node. Each edge corresponds to an input character. Values are typically only stored at leaves or at inner nodes of particular interest. Thus, an access to a trie with the prefix "Ali" would start at the root node, traverse the edge "A," traverse the edge "l," and traverse the edge "i." From the resulting node, a search for all the leaves descended from this node will return the set of all words or phrases having the prefix "Ali."

Another possible data structure that could be used is a radix trie, also known as a patricia trie. The radix trie is a space-optimized version of the trie where each node with only one child is merged with its child.

The set of text from which proposed autocompletions are generated may be referred to as an autocomplete dictionary or just dictionary. The dictionary may comprise a data structure and may be stored in computer memory or storage. Thus, in accordance with some embodiments, at least some text from the file to be saved may be stored in an autocomplete dictionary. In various embodiments, the text from the file can be grouped in different ways. First, a computer program might insert individual words from the file into the dictionary. Second, the computer program might group together words that are associated with each other and insert those into the dictionary as a phrase. For example, an adjective and noun might be grouped together (e.g., "Alice's Adventures," "White Rabbit") as might adverbs and verbs. Similarly, words might be grouped by comparing sets of words from the file against a data structure of known related words, for instance "Oh dear," "worth the trouble," or "just in time." In this manner, groups of related words in the file can be detected and entered into the dictionary as a unit. Third, the computer program might group together phrases of words based on punctuation. For example, it might insert as a group sets of words that end with a line break (e.g., "Alice's Adventures in Wonderland," "Down the Rabbit-Hole") or sets of words that are separated by commas, semicolons, periods, or other punctuation (e.g. "Alice started for her feet," "I shall be late").

Proposed autocompletions may be generated by submitting the user-entered text to the autocomplete dictionary. Words, groups of words, and phrases may be returned when their prefix matches the user-entered text. In some embodiments, the entire string of user-entered text may be used. For instance, if the user enters "Down the" then the autocomplete dictionary searches for "Down the" and potentially returns "Down the Rabbit-Hole."

Figure 4:
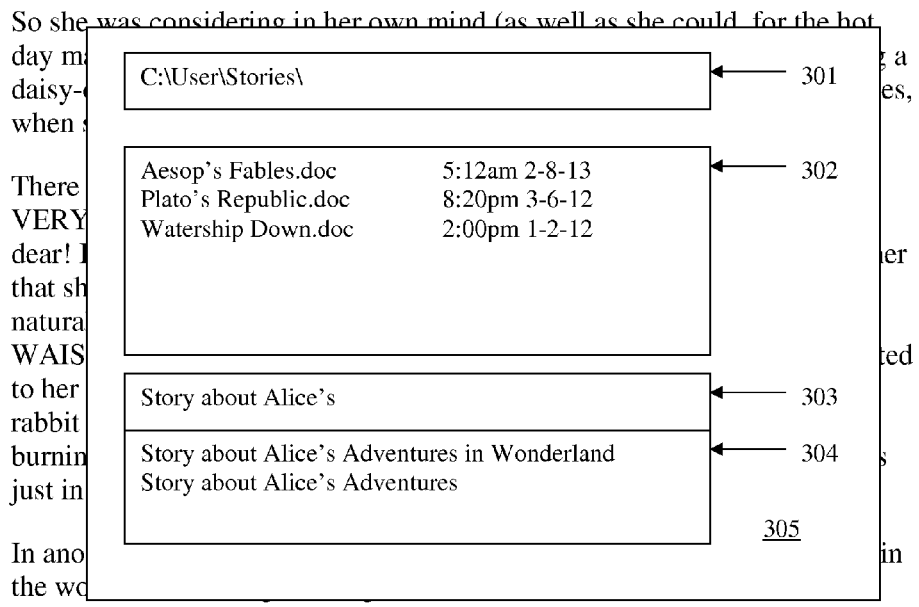
FIG. 4 illustrates an exemplary interface that may be displayed in some embodiments.

As shown in FIG. 4, other embodiments may use only a portion of the string of user-entered text when determining proposed autocompletions (as opposed to the entire string). In some embodiments, only the portion of the user-entered string after a certain delimiter is used. For instance, some embodiments might perform matching based on the text after a space in the user-entered text. Thus, if the user enters "Story about Alice's," the entire user-entered text would not match any text in the file. However, by considering only the text "Alice's," which is delimited by a space, the program might return "Adventures in Wonderland" as a proposed autocompletion. If the user continued to type and entered "Story about Alice's Adventures in," the program may continue to perform autocompletion matching starting at the word "Alice's" and continuing to the end of the user text entry (in other words, matching based on the phrase "Alice's Adventures in") because "Alice's" is the earliest word in the user text entry, separated by a delimiter, for which the remainder of the user entry has at least one match.

Also, some embodiments may perform autocompletion based on case-sensitive matching with the user-entered text, whereas other embodiments may not be case-sensitive.

Figure 5A:
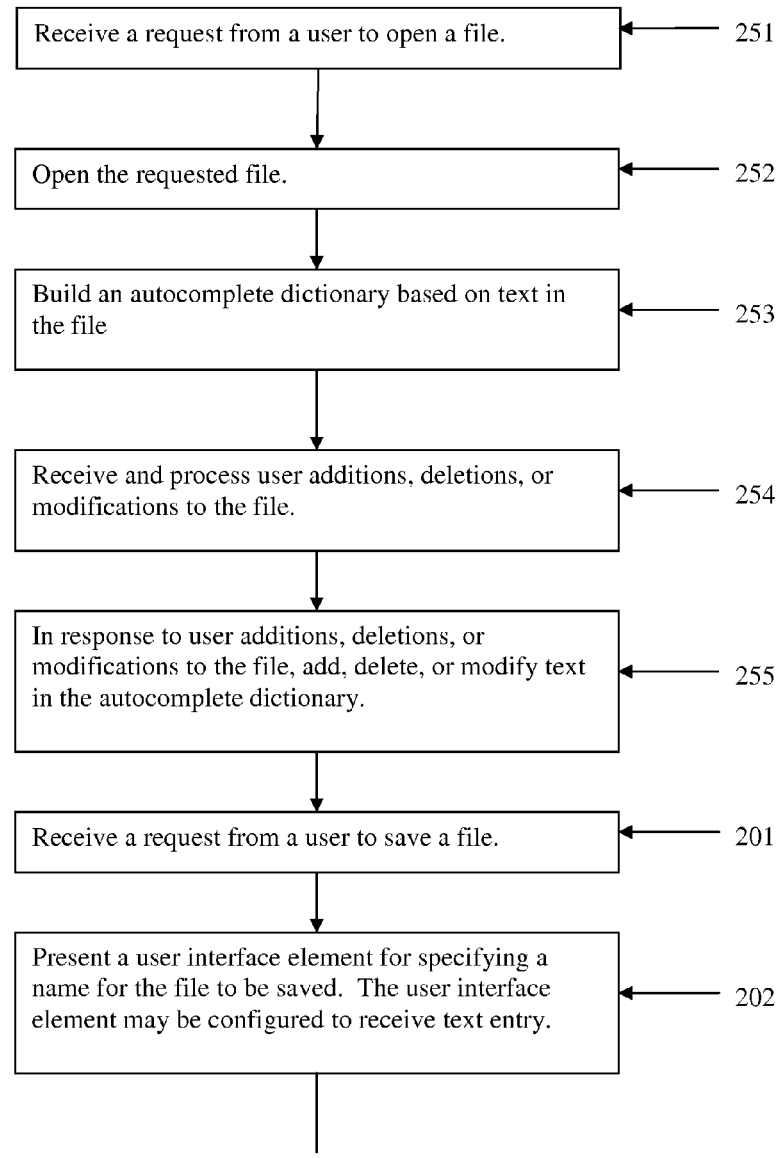
FIGS. 5A-B illustrate an exemplary method that may be performed in some embodiments.
Figure 5B:
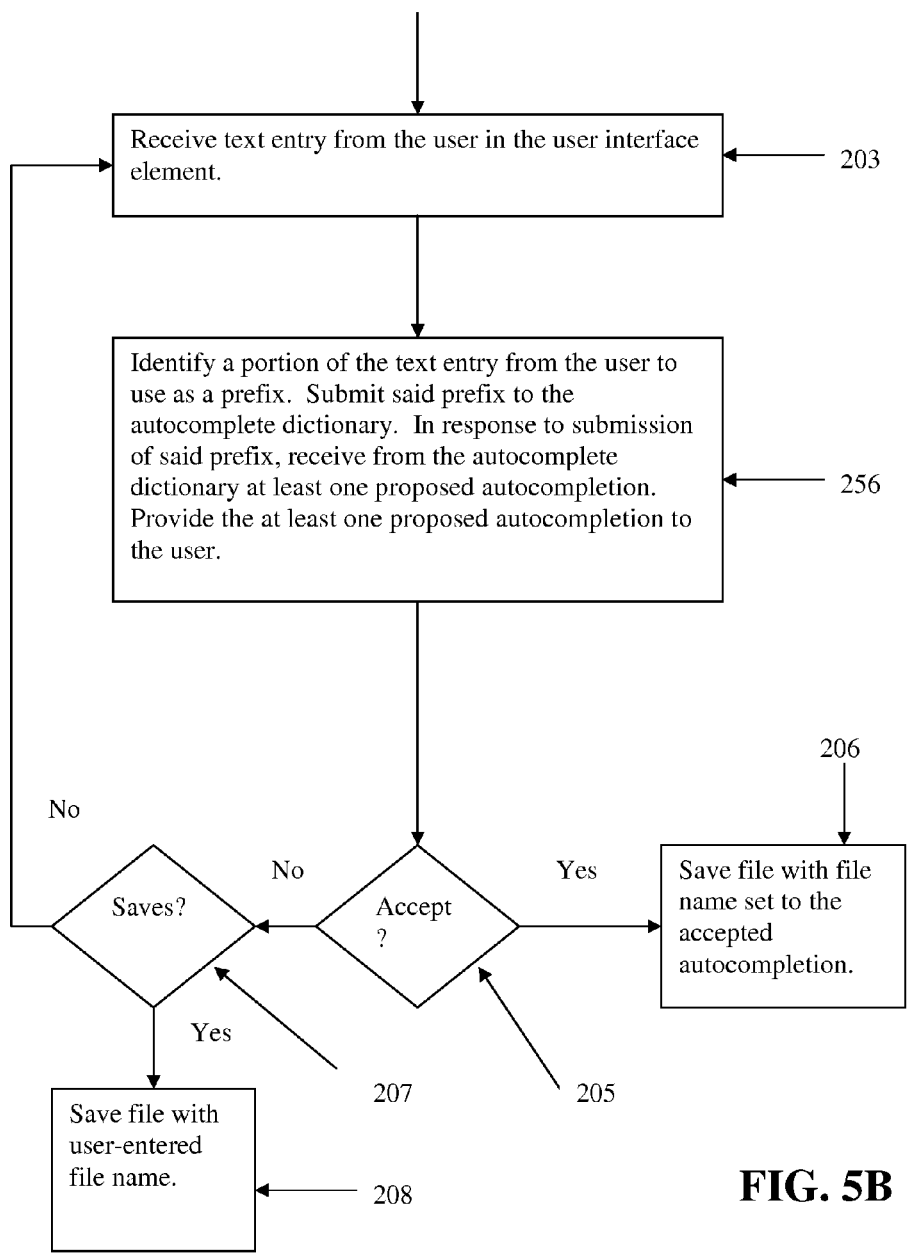

FIGS. 5A-B present a flow chart illustrating one exemplary method 500 that may be performed consistent with the invention. Steps that have been previously discussed are numbered consistently with their prior discussion.

The computer system performing the method 500 may receive a request from a user to open a file (Act 251). In response, the computer system may open the requested file (Act 252). It may, for instance, present the file to the user. The computer system may build an autocomplete dictionary based on text in the file (act 253). The computer system does not necessarily need to add all the text in the file to the autocomplete dictionary. Rather, the computer system may build the autocomplete dictionary by adding some text in the file to the dictionary.

The user may then edit the file, for instance performing additions, deletions, or modifications to the text. Thus, the computer system may receive and process user additions, deletions, or modifications to the file (Act 254). In response to the user additions, deletions, or modifications to the file, the computer system may add, delete, or modify text in the autocomplete dictionary (Act 255). This may involve performing insertion, deletion, or modification operations on a data structure storing the autocomplete dictionary.

The computer system may then receive a request from the user to save the file (Act 201). The computer system may present a user interface for specifying a name for the file to be saved (Act 202). The user interface element may be configured to receive text entry. The computer system may receive text entry from the user in the user interface element (Act 203). The computer system may identify a portion of the text entry from the user to use as a prefix. The portion may be the entire text entry or a subset of the text entry. The computer system may submit the prefix to the autocomplete dictionary. In response to submission of said prefix, the computer system may receive from the autocomplete dictionary at least one proposed autocompletion. The computer system may provide the at least one proposed autocompletion to the user. (Act 256).

The additional steps 205, 206, 207, and 208 may also be performed and have been previously described. If the user does not accept an autocompletion and also does not save the file, but rather continues to enter, delete, or modify text in the user interface element, then processing may return to step 203.

Some of the steps of exemplary method 500 may be performed in different orders or in parallel. Also, the steps of exemplary method 500 may occur in two or more computers, for example if the method is performed in a networked environment. Various steps are optional.

Figure 6A:
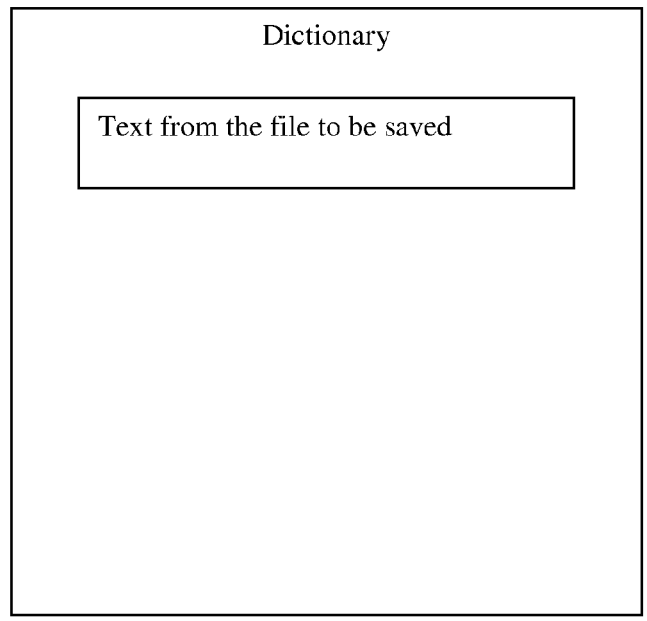
FIG. 6A is an exemplary diagram of one possible autocomplete dictionary.
Figure 6B:
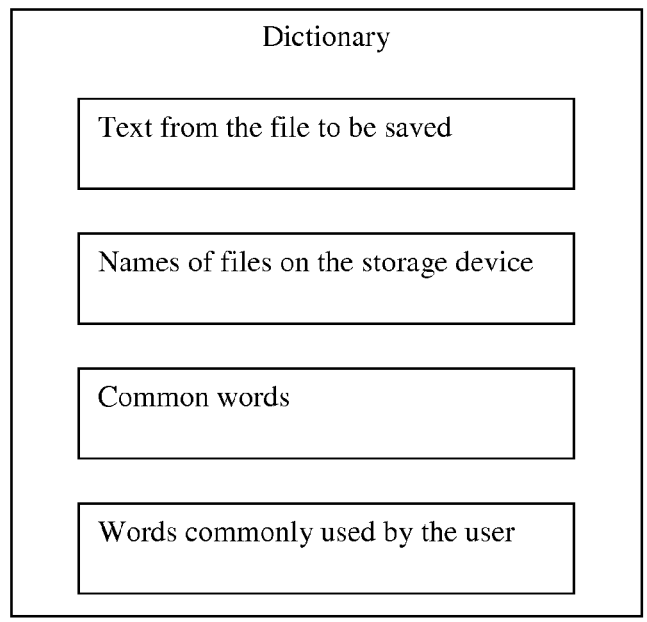
FIG. 6B is an exemplary diagram of one possible autocomplete dictionary.

As shown in FIG. 6A, in some embodiments the autocomplete dictionary used for proposing autocompletes to the user-entered proposed file name includes only text from the file to be saved. However, as shown in FIG. 6B, other embodiments include other text in the autocomplete dictionary, such as the names of other files on the relevant computer storage device (such as files in the current directory), common words in the language, or words commonly found in other documents created by the user (possibly limited to a certain type, such as files in a certain directory, files that are word processing documents, or a specified set of files). Said other text may be inserted into an autocomplete dictionary when it is built, for instance in step 253 of method 500. Said other text may also be inserted into the autocomplete dictionary at various other times; for instance, the names of other files in the current directory may be added to the autocomplete dictionary when the user first opens the file save interface (e.g., step 202) or when the user navigates to a new directory in the file save interface (see e.g., user interface elements 301, 302).

Figure 6C:
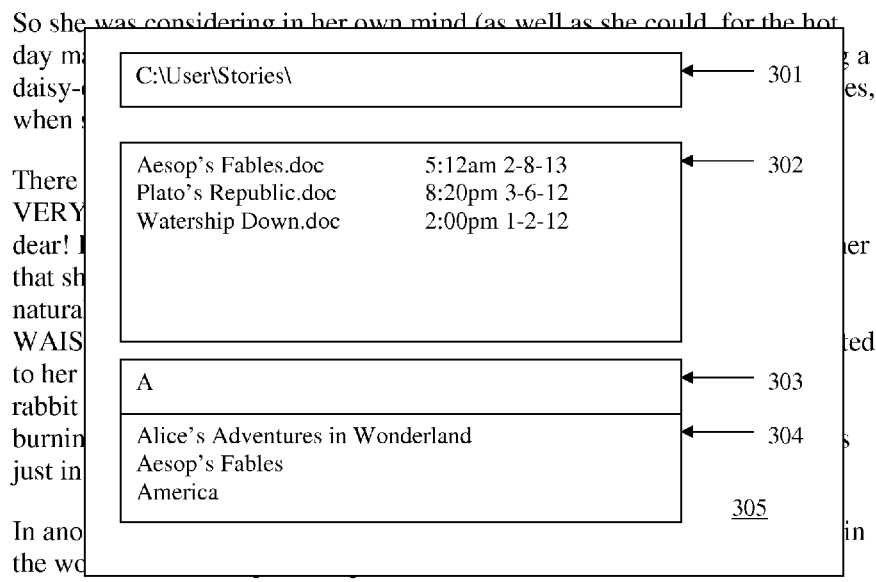
FIG. 6C illustrates an exemplary interface that may be displayed in some embodiments.

For example, as shown in FIG. 6C, the user has entered the letter "A." The first result, "Alice's Adventures in Wonderland," comes from the text of the file. The second result, "Aesop's Fables," is the name of a file on the computer storage. The third result, "America," is a common word.

In embodiments of the invention that display a list of more than one proposed autocompletion, various methods can be used to rank that list. In one possible method, the proposed autocompletions may be based on the frequency of occurrences of the particular words in the file. For example, since the word "Alice" appears frequently in the file 300, the word "Alice" might appear near the top of a ranked list for prefixes matching "Alice." Frequency might be based on raw frequency of occurrences but may also be based on a frequency normalized based on how often words occur in other corpuses. For example, "a" is a common word in the English language so that may be factored into the frequency analysis. One way to do this is to define a normalized frequency to be Freq(file)/Freq(corpus) where file is the file to be saved and corpus is some corpus representative of common usage of the relevant language (e.g., English). Another possible normalized frequency is Freq(file)/Freq(corpus)^2. More generally a normalized frequency may be G(Freq(file), Freq(corpus)) where G is a specified function.

A second possible method for ranking proposed autocompletions is to rank longer autocompletions higher than shorter autocompletions. For example, this would place "Alice's Adventures in Wonderland" ahead of "Alice's Adventures."

A third possible method for ranking proposed autocompletions is to rank words or phrases occurring earlier in a file higher than words or phrases occurring later. This is based on the notion that more important words or phrases are likely to be mentioned earlier.

A fourth possible method is to rank proposed autocompletions based on their prominence. For example, this could be based on font size (larger is more prominent), whether the text comes from a header or section title, or whether the text appears on a separate line.

If additional sources of autocompletions are used in addition to the text from the file, then the autocompletions may be ranked based on where they are from. For instance, file names from the computer storage device may be ranked lower (or higher) than words or phrases from the file to be saved. These rankings may be adjusted dynamically based on the user's choices. For example, if the user consistently chooses autocompletions based on file names from the computer storage device, then those may eventually be ranked higher.

Furthermore, some methods of ranking may take into account multiple factors. For example, the various factors above could be combined according to an algorithm. Such an algorithm may be a linear equation that applies various weights to the factors, or a non-linear equation.

In some embodiments, only a selection of words, groups of words, or phrases from the file are used as proposed autocompletions, and various methods may be used to select which words, groups of words, or phrases are included in the autocomplete dictionary. For instance, in some cases it may be desirable to only include the most common words in the file in the autocomplete dictionary. Thus, all words or groups of words/phrases with frequency>X, for some value of X, may be added to the autocomplete dictionary, whereas all those words or groups of words/phrases with frequency<=X might not be added to the autocomplete dictionary. Another possibility is to only include words or groups of words/ phrases having a normalized frequency above a certain threshold.

Conversely, some embodiments might exclude from the autocomplete dictionary any words that are very common in the English language. Such words may include "a," "an," "the," "that," and so forth.

In other embodiments, only words, groups of words, or phrases having a length over a certain threshold are added to the autocomplete dictionary.

In some embodiments, proposed autocompletions may be limited to only text from certain parts of a file, such as certain sections or certain page intervals. For instance, in some embodiments, the proposed autocompletions may be limited to text from the first page or first two pages, or from the first section.

In other embodiments, only words, groups of words, or phrases having a certain level of prominence are included in the autocomplete dictionary. For instance, in some embodiments only words/groups of words/phrases of a certain font size are used for autocompletion. Or, only words/groups of words/phrases that are section titles are used for autocompletion. Or possibly, only words/groups of words/phrases that are headings are used for autocompletion. Or possibly, only words/groups of words/phrases that are on a separate line are used for autocompletion.

Similarly, any of the above methods for selecting words to use in the autocomplete dictionary may be combined via an algorithm that weighs the various factors. Possible algorithms include linear equations and non-linear equations.

Embodiments of the invention may be used on a wide variety of computing devices in accordance with the definition of computer and computer system earlier in this patent. Mobile devices such as cellular phones, smart phones, PDAs, and tablets may implement the functionality described in this patent. Autocomplete may be useful on a mobile device because text input is often more cumbersome on a mobile device. A mobile device is any portable device.

While some embodiments of the invention have been illustrated with reference to a text file, the methods described herein may be applied to a wide variety of file types including but not limited to text documents, word processing documents, spreadsheets, presentations, emails, files in a database, web pages, and any other savable document containing text or graphics that can be interpreted as text. Documents containing only images may use the methods described herein through use of optical character recognition (OCR). OCR can recognize text from images. OCR could be applied prior to application of methods such as methods 200, 201, 500 or OCR could be added as a step in the methods herein, such as methods 200, 201, 500. OCR is available from various sources such as FreeOCR (freeocr.net), Tesseract (code.google.com/p/tesseract-ocr/), SimpleOCR (www.simpleocr.com/Download.asp), GOCR (jocr.sourceforge.net), and the like.

While some embodiments have been illustrated where the file to be saved is currently open for viewing by the user, that is not required. Embodiments of the invention may be used to name a file to be saved without the file being currently open.

While the invention has been particularly shown and described with reference to specific embodiments thereof, it should be understood that changes in the form and details of the disclosed embodiments may be made without departing from the scope of the invention. Although various advantages, aspects, and objects of the present invention have been discussed herein with reference to various embodiments, it will be understood that the scope of the invention should not be limited by reference to such advantages, aspects, and objects. Rather, the scope of the invention should be determined with reference to patent claims.

What is claimed:

1. A method for suggesting autocompletions to a file name for a file to save, the method performed by a computer system, the method comprising:
    receiving at the computer system a request from a user to open a file;
    in response to the request to open the file, opening the file;
    building an autocomplete dictionary based on text in the file by adding at least some text from the file to the autocomplete dictionary;
    receiving and processing user additions, deletions, or modifications to the file;

in response to receiving user additions, deletions, or modifications to the file, adding, deleting, or modifying text in the autocomplete dictionary;

receiving a request from the user to save the file;

in response to the request from the user to save the file, the computer system presenting a user interface element for specifying a name for the file to be saved, the user interface element configured to receive text entry;

receiving text entry from the user in the user interface element;

submitting at least a portion of the text entry of the user to the autocomplete dictionary in order to search the autocomplete dictionary;

in response to the search based on the portion of the text entry of the user, receiving from the autocomplete dictionary a set of at least one proposed autocompletions, wherein the proposed autocompletions contain the portion of the text entry of the user as a prefix;

presenting, by the computer system, the set of proposed autocompletions to the user;

receiving an acceptance of one of the proposed autocompletions from the user;

saving the file with a file name set to the accepted autocompletion.

2. The method of claim 1, further comprising providing at least one proposed autocompletion of the portion of the text entry of the user based on one or more names of files on a computer storage device connected to the computer system.

3. The method of claim 1, further comprising providing at least one proposed autocompletion of the portion of the text entry of the user based on a list of common words of a language.

4. The method of claim 1, wherein the step of saving the file with the file name set to the accepted autocompletion comprises saving the file in a local storage location.

5. The method of claim 1, wherein the step of saving the file with the file name set to the accepted autocompletion comprises saving the file on a remote storage device located across a network.

6. The method of claim 1, wherein the step of saving the file with the file name set to the accepted autocompletion comprises saving the file in a database accessible to a plurality of other users via a pool of remote servers.

7. The method of claim 1, further comprising receiving additional text input from the user in the user interface element for specifying the name for the file; and presenting at least one new proposed autocompletion of the text entry of the user, wherein the at least one new proposed autocompletion is retrieved from the autocomplete dictionary and is based on text in the file.

8. The method of claim 1, further comprising:

presenting a user interface element for displaying a current directory for saving the file;

presenting a display of files stored in the current directory;

allowing the user to modify the current directory for saving the file.

9. The method of claim 1, wherein the autocomplete dictionary stores single words from the text of the file and phrases of multiple words from the text of the file.

10. The method of claim 1, wherein at least two proposed autocompletions are presented, and the method further comprises ranking the proposed autocompletions based on their frequency of occurrence as text in the file.

11. A non-transitory computer-readable medium containing instructions for suggesting autocompletions to a file name for a file to save, the instructions for execution by a computer system, the non-transitory computer-readable medium comprising:

instructions for receiving at the computer system a request from a user to open a file;

instructions for, in response to the request to open the file, opening the file;

instructions for building an autocomplete dictionary based on text in the file by adding at least some text from the file to the autocomplete dictionary;

instructions for receiving and processing user additions, deletions, or modifications to the file;

instructions for, in response to receiving user additions, deletions, or modifications to the file, adding, deleting, or modifying text in the autocomplete dictionary;

instructions for receiving a request from the user to save the file;

instructions for, in response to the request from the user to save the file, the computer system presenting a user interface element for specifying a name for the file to be saved, the user interface element configured to receive text entry;

instructions for receiving text entry from the user in the user interface element;

instructions for submitting at least a portion of the text entry of the user to the autocomplete dictionary in order to search the autocomplete dictionary;

instructions for, in response to the search based on the portion of the text entry of the user, receiving from the autocomplete dictionary a set of at least one proposed autocompletions, wherein the proposed autocompletions contain the portion of the text entry of the user as a prefix;

instructions for presenting, by the computer system, the set of proposed autocompletions to the user;

instructions for receiving an acceptance of one of the proposed autocompletions from the user;

instructions for saving the file with a file name set to the accepted autocompletion.

12. The non-transitory computer-readable medium of claim 11, further comprising instructions for providing at least one proposed autocompletion of the portion of the text entry of the user based on one or more names of files on a computer storage device connected to the computer system.

13. The non-transitory computer-readable medium of claim 11, further comprising instructions for providing at least one proposed autocompletion of the portion of the text entry of the user based on a list of common words of a language.

14. The non-transitory computer-readable medium of claim 11, wherein the instructions for saving the file with the file name set to the accepted autocompletion comprise instructions for saving the file in a local storage location.

15. The non-transitory computer-readable medium of claim 11, wherein the instructions for saving the file with the file name set to the accepted autocompletion comprise instructions for saving the file on a remote storage device located across a network.

16. The non-transitory computer-readable medium of claim 11, wherein the instructions for saving the file with the file name set to the accepted autocompletion comprise instructions for saving the file in a database accessible to a plurality of other users via a pool of remote servers.

17. The non-transitory computer-readable medium of claim 11, further comprising instructions for receiving additional text input from the user in the user interface element for specifying the name for the file; and instructions for presenting at least one new proposed autocompletion of the text entry of the user, wherein the at least one new proposed autocompletion is retrieved from the autocomplete dictionary and is based on text in the file.

18. The non-transitory computer-readable medium of claim 11, further comprising:
instructions for presenting a user interface element for displaying a current directory for saving the file;
instructions for presenting a display of files stored in the current directory;
instructions for allowing the user to modify the current directory for saving the file.

19. The non-transitory computer-readable medium of claim 11, wherein the autocomplete dictionary stores single words from the text of the file and phrases of multiple words from the text of the file.

20. The non-transitory computer-readable medium of claim 11, wherein the instructions for presenting the set of proposed autocompletions to the user present at least two proposed autocompletions, and the non-transitory computer-readable medium further comprises instructions for ranking the proposed autocompletions based on their frequency of occurrence as text in the file.

\* \* \* \* \*